Feb. 27, 1962 W. J. SCAVUZZO ETAL 3,022,764
MECHANICAL SIGNAL DEVICE
Filed April 21, 1959 2 Sheets-Sheet 2

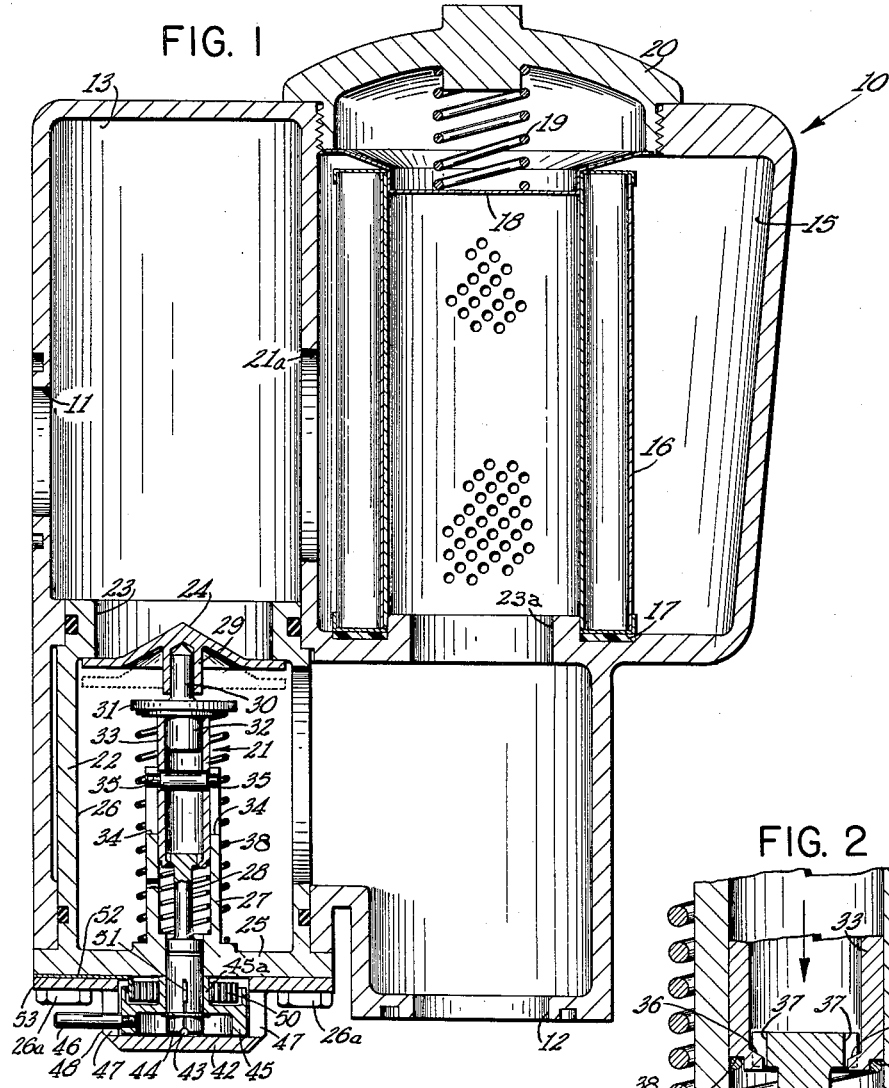

INVENTORS.
WILLIAM H. HULTGREN
WILLIAM J. SCAVUZZO
BY
Lawrence J. Winter
ATTORNEY 3,022,764
MECHANICAL SIGNAL DEVICE
William J. Scavuzzo, Clark, and William H. Hultgren, Readington, N.J., assignors to Purolator Products, Inc., Rahway, N.J., a corporation of Delaware
Filed Apr. 21, 1959, Ser. No. 807,846
8 Claims. (Cl. 116—70)

The present invention relates to a filter signal device and more particularly to a mechanical type signal device for indicating when the filter element has become clogged.

An object of the present invention is to provide a filter with a mechanical signal device operatively connected thereto to enable an operator to know when the filter needs cleaning or replacement in order to maintain an efficient degree of filtration of the fluid flowed therethrough and to avoid mechanical failure of the mechanism served by the fluid.

Another object of the present invention is to provide a mechanical signal device having linear and rotary movement for indicating when the filter needs servicing.

Another object of the present invention is to provide a filter signal device formed integrally with the relief or by-pass valve housing of the filter unit.

Another object of the present invention is to provide a filter signal device that is a component part of the by-pass valve assembly and may be incorporated as a packaged unit in conventional filter housings already in the field, and quickly and easily removed and replaced as a complete unit.

Another object of the present invention is to provide a mechanical signal device for a filter that must be reset manually after the device is once actuated to its signal position thereby calling to the operator's attention the fact that the filter element has been by-passed and there is need for inspection of the filter assembly.

Another object of the present invention is to provide a filter signal device which has only a rotary static seal and eliminates any need for a dynamic seal and leaking problems connected therewith.

Various other objects and advantages of the invention will be readily apparent from the following description when considered in connection with the accompanying drawing forming a part thereof, and in which FIG. 1 is a side elevational view, partly in section, illustrating the invention and showing the signal device in its non-signalling position, and FIG. 2 is an enlarged fragmentary section of the axially movable and rotational shafts embodied in the signal device of FIG. 1 shown engaged with one another, FIG. 3 is an enlarged fragmentary section of the axially movable and rotational shafts shown disengaged from one another.

FIG. 5 is a fragmentary enlarged view showing the filter signal device in a signal position.

Figure 3:
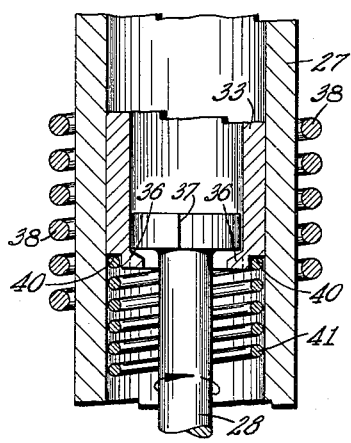

Referring to the drawings, the reference numeral 10 designates a filter housing or casing provided with an inlet 11 and a discharge opening 12 therein for flowing oil through the filter unit. A by-pass chamber 13 is in the housing adjacent inlet 11 and a relief or by-pass valve disposed therein. The main filter chamber 15 is disposed therein adjacent chamber 13 and has a wire mesh, sintered metal or annular resin impregnated pleated paper filter element 16 therein. Filter 16 is seated on a gasket 17 while the upper end of the filter element is sealed by member 18 which extends into the center tube of the filter and is held thereagainst by a compression spring 19 mounted against the inner surface of the detachable filter cover 20.

The by-pass or relief valve assembly 21 comprises a valve cage or housing 22 having a valve ring 23 on one end and a rectangular shaped plate member 25 on the other end connected by strut members 26 only one member being seen in the drawings. A disc valve 24 is adapted to seat on ring 23. The by-pass valve housing is provided with conventional O ring seals to prevent leakage around it and is easily inserted in the filter casing as a single unit after which it is secured thereto by bolts 26a which extend into the filter casing. Plate member 25 is provided with a central depending sleeve 27 into which extends a rotary shaft 28.

Figure 4:
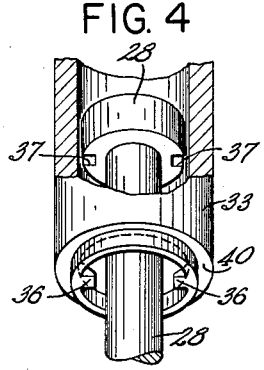
FIG. 4 is a perspective view, partly broken away, of the axially movable and rotational shafts disengaged from each other.

A hollow boss 29 is provided in valve disc 24 to receive rod 30 of valve guide 31. Guide 31 has a cylindrical projection 32 on its opposite side with an actuator sleeve 33 slidably mounted thereon. The other end of sleeve 33 extends into depending sleeve 27 adjacent shaft 28 and is adapted for axial or slidable movement with respect to shaft 28 and sleeve 27. The end of depending sleeve 27 is provided with oppositely disposed vertical slots 34 therein through which extends a lock pin 35 disposed in sliding sleeve 33 to prevent rotation of sleeve 33. As can be seen in FIGS. 2 and 4, sleeve 33 has bayonet lock pins 36 adapted to be engaged in oppositely disposed slots 37 in rotary shaft 28 to normally prevent shaft 28 from rotating, as hereinafter described. A compression spring 38 is mounted around depending sleeve 27 and bears against valve guide 31 to normally maintain valve disc 24 seated. Sleeve 33 adjacent bayonet pins 36 is provided with a necked in portion forming an annular or circumferential shoulder 40 thereon against which seats compression spring 41 disposed within depending sleeve 27 for normally holding sleeve 33 in contact with valve guide 31 when valve disc 24 is closed or seated.

The portion of rotary shaft 28 extending beyond plate 25 is enclosed by a cylindrical cover or casing 42. A ball bearing 43 is disposed on the end of shaft 28 to take up any end load thereon and prevent axial movement of the shaft in one direction while a snap ring 44 and the hub portion 45a of the signal device annular member 45 abutting plate member 25 prevents axial movement of the shaft in the opposite direction.

Annular member 45 is fixed to shaft 28 by a key or the like and has a detachable reset handle 46 extending through the cut away or slotted portion 47 of the indicator cover side wall. Shaft 28 is normally urged to rotate by a coiled torsion spring 50 having one end fixed to rotary shaft 28 as at 51 and the opposite end fixed to a flat plate 52 secured between plate member 25 and the bottom 53 of cover 42.

During normal operation oil to be filtered enters inlet 11 and flows through chamber 13 and opening 21a between the by-pass and filter chambers and passes in an outside in direction through filter element 16. Contaminants and dirt in the oil are deposited on the outer surface of element 16 after which the clean oil is discharged from chamber 15 through opening 23a and passes out of the filter unit through outlet 12. At this time disc valve 24 is seated and the signal device is in the position shown in FIG. 1 in a non signalling position indicating that the filter element requires no servicing.

When the contaminants in the dirty oil begin to clog the outer surface of the pleated filter element so as to build up a differential pressure across the filter element above a predetermined value, valve disc 24 unseats or opens as shown in dotted lines in FIG. 1, overcoming the force in compression springs 38 and 41 maintaining it seated. Bayonet pins 36 of sleeve 33 are engaged in slots 37 of shaft 28, at this time, as shown in FIG. 2. The raising of valve 24 causes valve guide 31 to move actuator sleeve 33 linearly or axially of depending sleeve 27 thereby moving bayonet points 36 out of the slots 37 of rotary shaft 28, to the position shown in FIG. 3. The release of rotary shaft 28 causes torsion spring 50 to rotate it to the right, in the direction of the arrow indicated in FIGS. 2 and 3. Since signal device 45 and handle 46 are fixed to shaft 28 they, too, are then rotated in the position shown in FIG. 5 or into a signal position indicating the filter element is clogged and needs cleaning or replacement. The portion of device 45 showing through slot 47 at this time has a red anodized surface to clearly indicate the device is in a signal position.

When the filter has been serviced and is ready for operation again, it is merely necessary to reset the signal device to its non-signalling position by turning or rotating handle 46 to the left back to the position shown in FIG. 1. It will be particularly noted that the indicator device will not return to its non-signalling position without manual resetting because once the device has been set off, bayonet points 36 are moved out of alignment with slots 37 in rotary shaft 28 and hang or rest on the shoulder thereof until returned manually to their indexed position. This non-return feature prevents any rupture in the filter element from temporarily unseating valve disc 24 due to a rapid build up of differential pressure just before the rupture occurs, and reseating of the valve without the operator knowing something has gone amiss.

It will also be noted that the construction of the signal device and valve housing or cage of an integral one piece casting permits it to be readily inserted and replaced in a filter as a complete unit by merely removing bolts 26a which extend through plate 25 into the filter unit casing. The present invention further permits conversion of present conventional filter units in the field to a signal device filter unit in an economical manner by unskilled labor.

The signal device of the present invention also has the advantage that it requires no dynamic seals other than the static rotary O ring seal provided in shaft 28.

Inasmuch as various changes may be made in the form, location and relative arrangement of the several parts without departing from the essential characteristics of the invention, it will be understood that the invention is not to be limited except by the scope of the appended claims.

What is claimed is:

1. An indicator and a valve ring and plate member forming a valve cage, a disc valve having a boss normally seated on said ring, a valve guide having a cylindrical projection thereon extending into said boss, a depending sleeve on said member, a rotatable shaft extending through said depending sleeve and member and fixed axially thereof, means for rotating said shaft, a signal device connected to said shaft adapted to rotate to a signal position when said shaft is rotated, an axially slidable sleeve having one end extending into said depending sleeve adjacent said shaft and the opposite end mounted over said guide projection, said shaft having slots therein, lug means on one end of said slidable sleeve engaged in said slots to prevent said shaft from rotating when the valve is seated, said disc valve being adapted to be unseated to disengage said slidable sleeve and shaft and rotate said signal device to a signal position.

2. An indicator and valve cage formed by a plate member and valve ring spaced from one another by connecting members, a disc valve normally seated on said ring, a depending sleeve on said member, a rotatable shaft disposed in said sleeve and fixed axially thereof, means for rotating said shaft, a signal device connected to said shaft adapted to move to a signal position when said shaft is rotated, an axially slidable sleeve having one end extending into said depending sleeve and the opposite end in contact with said valve, said shaft having slots therein adapted to receive lugs on said slidable sleeve to prevent rotation of said shaft when said valve is seated, said slidable sleeve being adapted to move axially of said shaft to disengage said lugs therefrom when said valve is unseated to permit rotation of said signal device to a signal position.

3. An indicator and valve cage formed by a plate member and valve ring spaced apart by connecting members, a disc valve normally seated on said ring having a boss thereon, a valve guide engaged in said boss, a cylindrical projection on said valve guide, a depending sleeve on said member, a rotatable shaft disposed in said sleeve and fixed axially thereof, means for rotating said shaft, a signal device connected to said shaft adapted to move a signal position when the shaft is rotated, an axially slidable sleeve having lugs on one end thereof, said slidable sleeve extending into said depending sleeve adjacent the end of said shaft, said shaft having slots therein adapted to receive said lugs to prevent rotation thereof when said valve is seated, the other end of said slidable sleeve being mounted over said cylindrical projection, biasing means for maintaining said valve seated and said lugs in said slots, means for preventing said slidable sleeve from rotating, said slidable sleeve being adapted to move axially of said shaft to disengage said lugs therefrom when said valve is unseated to permit rotation of said signal device to a signal position.

4. An indicator for use with a filter by-pass valve comprising a signal device, a rotatable member connected to the device for rotating it to a signal position, means for rotating said rotatable member, a slidable member having locking means engaging said rotatable member to prevent movement of the rotatable member when said valve is seated, said slidable member being disposed to disengage with said rotatable member when said valve is open.

5. An indicator for use with a filter by-pass valve comprising a signal device, a rotatable shaft connected to said signal device for actuating it to a signal position, means for rotating said shaft, a sleeve axially slidable of said shaft having locking means engaging said shaft to prevent rotation thereof when said by-pass valve is seated, said slidable sleeve being disposed to disengage with said rotatable member to permit it to move to a signal position when said by-pass valve is opened.

6. An indicator for use with a by-pass filter valve comprising a casing member, a depending sleeve on said casing, a signal device, a rotatable shaft in said sleeve connected to said signal device for rotating it to a signal position, menas for rotating said shaft, an actuator sleeve axially slidable of said depending sleeve, locking means on said actuator sleeve engaging said rotatable shaft to prevent it from rotating when said valve is closed, said actuator sleeve being disposed to move said locking means out of engagement with said rotatable shaft to release said signal device to a signalling position when said valve is opened.

7. An indicator for use with a filter by-pass comprising a valve cage with a valve ring and plate member, said by-pass valve being seated on said ring, a depending sleeve on said plate member, a rotatable shaft in said depending sleeve, means for rotating said shaft, a signal device connected to said shaft for rotation to a signal position, an actuator sleeve axially slidable of said depending sleeve, locking means on said actuator sleeve engaging said rotatable shaft to prevent it from rotating, said actuator sleeve being disposed to disengage said rotatable shaft to permit the signal device to move to a signal position when said valve is opened.

8. An indicator for use with a filter by-pass valve comprising a valve ring and plate member forming a valve cage, said valve being seated on said ring, a depending sleeve on said plate member, a rotatable shaft mounted in said sleeve, means for rotating said shaft, a signal device connected to said shaft for rotation to a signal position, an actuator sleeve having one end thereof extending into the depending sleeve adjacent the rotatable shaft, and its opposite end in contact with said by-pass valve, said actuator sleeve being axially slidable of said depending sleeve, said rotatable shaft having slots therein, lugs on said actuator sleeve engaging said slots to prevent rotation of said shaft, said actuator sleeve being disposed to disengage with said rotatable shaft when said valve is unseated to release said signal device to a signal position.

References Cited in the file of this patent

UNITED STATES PATENTS

| | | |
|---|---|---|
| 1,480,909 | Johnson | Jan. 15, 1924 |
| 1,534,881 | Stokoe | Apr. 21, 1925 |
| 2,879,892 | Frakes | Mar. 31, 1959 |

FOREIGN PATENTS

| | | |
|---|---|---|
| 1,135,084 | France | Apr. 24, 1957 |